United States Patent [19]

Mukoujima et al.

[11] Patent Number: 4,634,915
[45] Date of Patent: Jan. 6, 1987

[54] MOUNT FOR SURFACE WAVE MOTOR

[75] Inventors: Hitoshi Mukoujima; Akira Hiramatsu, both of Yokohama; Hiroyasu Murakami, Tokyo; Makoto Katsuma, Kawasaki, all of Japan

[73] Assignee: Canon Kabushiki Kaisha, Tokyo, Japan

[21] Appl. No.: 774,166

[22] Filed: Sep. 9, 1985

Related U.S. Application Data

[63] Continuation of Ser. No. 663,144, Oct. 22, 1984, abandoned.

[30] Foreign Application Priority Data

Oct. 26, 1983 [JP] Japan ................................ 58-200371

[51] Int. Cl.$^4$ ............................................ H01L 41/08
[52] U.S. Cl. .................................................... 310/323
[58] Field of Search ............... 310/323, 388, 358, 359, 310/366

[56] References Cited

U.S. PATENT DOCUMENTS

| | | | |
|---|---|---|---|
| 4,019,073 | 4/1977 | Vishnevsky et al. | 310/359 X |
| 4,104,553 | 8/1978 | Engdahl et al. | 310/352 |
| 4,210,837 | 7/1980 | Vasiliev et al. | 310/323 |
| 4,400,641 | 8/1983 | Vishnevsky et al. | 310/328 X |
| 4,453,103 | 6/1984 | Vishnevsky et al. | 310/323 |
| 4,513,219 | 4/1985 | Katsuma et al. | 310/328 |

OTHER PUBLICATIONS

Japanese Patent Gazette 45851/1983.
Japanese U.M. Gazette 17229/1959; 7614/1958; 3611/1984.
Japanese Patent Gazette 24576/1961.

*Primary Examiner*—Mark O. Budd
*Attorney, Agent, or Firm*—Fitzpatrick, Cella, Harper & Scinto

[57] ABSTRACT

A surface wave motor for driving a rotor by a traveling surface wave has at least three pins radially extending from a ring-shaped vibration member to support the vibration member.

25 Claims, 6 Drawing Figures

MOUNT FOR SURFACE WAVE MOTOR

This application is a continuation of application Ser. No. 663,144 filed Oct. 22, 1984 now abandoned.

BACKGROUND OF THE INVENTION

1. Field of the Invention

The present invention relates to a surface wave motor for driving a rotor on a ring-shaped vibration member by a travelling surface wave generated in the vibration member.

2. Description of the Prior Art

The surface wave motor translates a vibration motion created when a periodic voltage is applied to an electrostrictive element to a rotational motion or linear motion. Since it requires no winding as compared to a conventional electromagnetic motor, it is simple in structure, of small size and produces a high torque even at a low rotating speed. Accordingly, interest therein has been recently increasing.

FIGS. 1 and 2 illustrate the principle of drive of a prior art surface wave motor. FIG. 1 illustrates generation of a surface wave in the surface wave motor. Electrostrictive elements $2a$ and $2b$ bonded to a metal vibration member 1 are arranged on upper and lower sides of the vibration member 1 for the sake of convenience of explanation, but they are actually arranged on one side of the vibration member 1 in the spaced relation to meet a requirement of spatial phase difference of $\lambda/4$.

The vibration member 1 is used as one electrode for the electrostrictive elements $2a$ and $2b$, and an A.C. voltage of $V = V_0 \sin \omega t$ from an A.C. power supply $3a$ is applied to the electrostrictive element $2a$ while an A.C. voltage of $V = V_0 \sin (\omega t \pm \pi/2)$ having a phase difference of $\lambda/4$ is applied to the electrostrictive element $2b$ through a 90° phase shifter $3b$. Signs (+) and (−) in the above formula are selected by the phase shifter $3b$ depending on a direction of movement of a movable member 5. Let us assume that the sign (−) is selected so that the voltage of $V = V_0 \sin (\omega t - \pi/2)$ is applied to the electrostrictive element $3b$. If only the electrostrictive element $2a$ is vibrated by the voltage of $V = V_0 \sin \omega t$, a vibration by a standing wave is generated as shown in FIG. 1(a). If only the electrostrictive element $2b$ is vibrated by the voltage of $V = V_0 \sin (\omega t - \pi/2)$, a vibration by a standing wave is generated as shown in FIG. 1(b). When the two A.C. voltages having the phase difference are simultaneously applied to the respective electrostrictive element and $2a$ and $2b$ the surface wave travels. FIG. 1(A) shows a wave at $t = 2n\pi/\omega$, FIG. 1(B) shows a wave at $t = \pi/2\omega + 2n\pi/\omega$, FIG. 1(C) shows a wave at $t = \pi/\omega + 2n\pi/\omega$ and FIG. 1(D) shows a wave at $t = 3\pi/2\omega + 2n\pi\omega$. A wavefront of the surface wave travels in an X direction.

Such a travelling wave includes a longitudinal wave and a lateral wave. Looking at an apex A of the vibration member 1 shown in FIG. 2, the movable member 5 is press-contacted to the surface of the vibration member 1 which makes a counterclockwise rotating elliptic motion with a longitudinal amplitude u and a lateral amplitude w and it contacts only the apex of the vibration plane. Accordingly, the movable member 1 is driven by a component of the longitudinal amplitude u of the elliptic motion of mass points A, A′, . . . at the apex and moved in a direction of arrow N.

When the phase is shifted by +90° by the 90° phase shifter, the vibration wave travels in a −X direction and the movable member 1 is moved opposite to the direction N.

A velocity at the apex of the mass point A is $V = 2\pi f u$ (where $f$ is a vibration frequency) and a velocity of the movable member 5 depends thereon and also depends on the lateral amplitude w because of a friction drive by the press-contact.

Thus, the velocity of the movable member 5 is proportional to the magnitude of the elliptic motion of the mass point A, and the magnitude of the elliptic motion is proportional to the voltage applied to the electrostrictive elements.

Accordingly, a high voltage is required to obtain a high rotating speed, and a high drive efficiency is hardly attained.

It is difficult to support the vibration member 1 without impeding the vibration. It is usually supported by felt material. However, precise positioning is difficult to attain and the material changes by aging. Accordingly, many problems are included in packaging the motor.

U.S. Pat. No. 4,104,553 discloses a technique to support a piezoelectric vibrator such as a crystal vibrator by a thin metal wire of an appropriate length determined by a predetermined condition at a node of the vibration or the smallest amplitude point so that the vibration of the vibrator is not propagated externally and an external disturbance is also not propagated to the vibrator. However, this technique relates to the technique to support a rod-like vibrator and it does not teach an appropriate method to support a ring-shaped vibrator.

SUMMARY OF THE INVENTION

It is an object of the present invention to provide a structure of a surface wave motor for driving a rotor on a ring-shaped vibration member by a travelling surface wave, and more particularly a high efficiency support for a ring-shaped vibration member of the surface wave motor.

In order to achieve the above object, in accordance with the present invention, the ring-shaped vibration member is supported by at least three pins which are radially arranged.

DETAILED DESCRIPTION OF THE PREFERRED EMBODIMENTS

Figure 1:
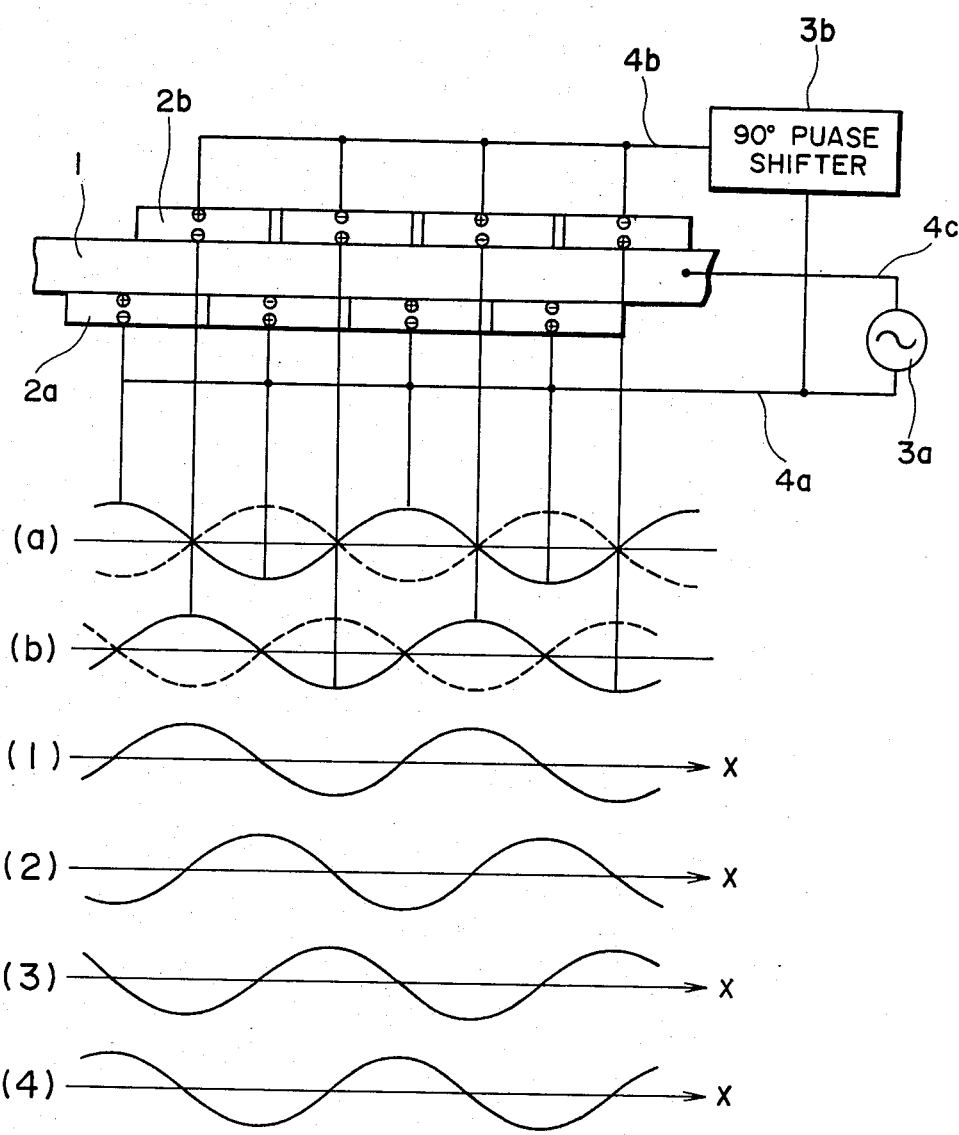
FIGS. 1 and 2 illustrate a principle of a surface wave motor.
Figure 2:
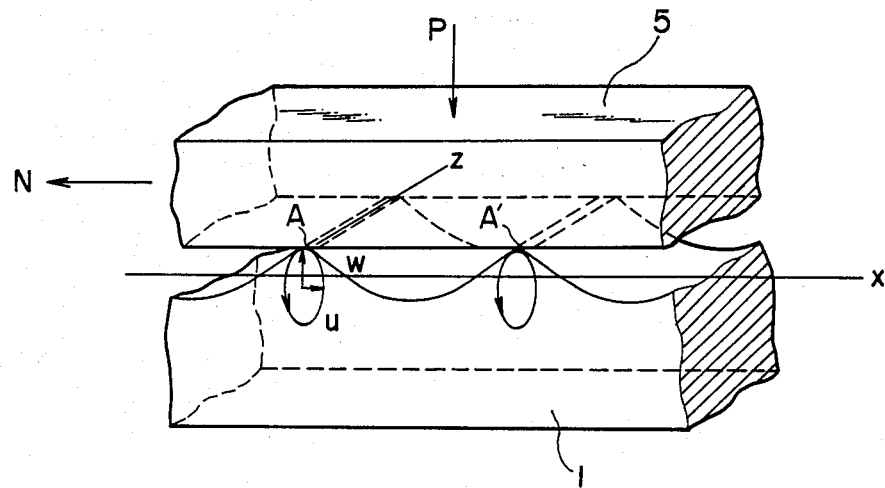
Figure 3:
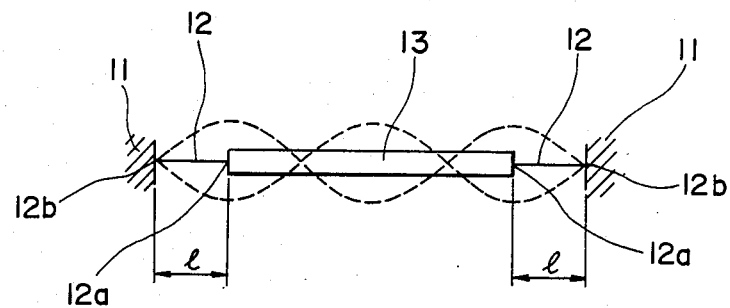
FIG. 3 illustrates a principle of the present invention.

FIG. 3 illustrates a principle of the present invention. The vibration of the ring-shaped vibration member 13 includes various vibration modes and a travelling wave. Unlike the rod-like vibration member such as a crystal vibrator which has only a simple vibration node, the ring-shaped vibration member has no node of vibration. If the ring-shaped vibration member 13 is supported to an outer wall 11 by an auxiliary vibration member 12 and the vibration node of the auxiliary vibration member 12 is set such that a loop of the vibration occurs at a junction $12a$ of the ring-shaped vibration member 13 and the auxiliary vibration member 12, the vibration of the ring-shaped vibration member 13 will not be impeded. In this case, a support end 12b which is opposite to the junction 12a of the ring-shaped vibration member 13 and the auxiliary vibration member 12 is a fixed end.

Broken lines in FIG. 3 show one example of vibration node.

The vibration of the auxiliary vibration member 12 follows the following bending vibration equation assuming that a length l is sufficiently longer than a thickness and a cross-sectional shape is constant.

$$EI\frac{\partial^4 y}{\partial x^4} + \rho A \frac{\partial^2 y}{\partial t^2} = 0 \qquad (1)$$

where
- x: coordinate on an axial line of a beam, with a support end being an origin point,
- y: coordinate in displacement direction of vibration from a neutral axis
- E: modulus of longitudinal elasticity
- I: sectional secondary moment of beam
- A: sectional area of beam
- $\rho$: density of beam By solving the equation (1) under boundary conditions of
(1) support end 12b: x=0 fixed end
  zero displacement: y=0
  zero flexure angle: dy/dx=0
(2) junction to ring: x=l, loop
  zero flexure angle: dy/dx=0
  zero shearing force: $d^3y/dx^3=0$
then we get $$l = \beta 4\sqrt{\frac{EI}{\rho A \omega^2}} \qquad (2)$$

where
- $\omega$: vibration frequency
- $\beta$: 2.365, 5.498, 8.639 (fundamental, secondary and ternary vibrations)

When the sectional shape of the beam, material of the beam and a resonant frequency of the ring-shaped vibration member 13 are given, the length l of the auxiliary vibration member 12 is determined from the equation (2).

Figure 4:
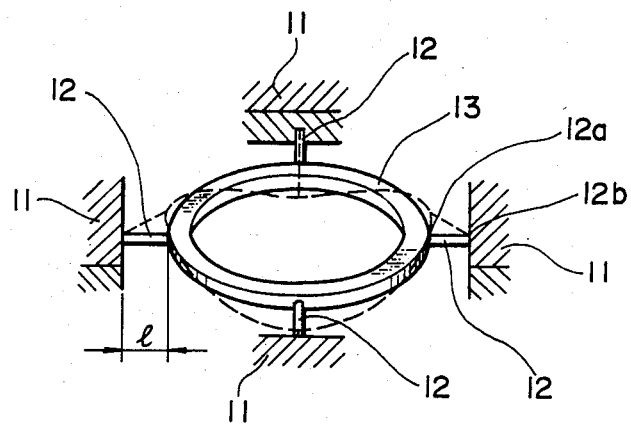
FIGS. 4 and 5 are conceptual views of the surface wave motor of the present invention.

FIG. 4 shows an embodiment applied to a surface wave motor. Four auxiliary vibration members are used although any number of members no less than three may be used.

Since the auxiliary vibration members are arranged to extend radially from the ring-shaped vibration member 13, they can stably support the ring-shaped vibration member.

In accordance with the above principle, since the length of the auxiliary vibration member 12 is properly selected as shown in the equation (2) even though the travelling surface wave is generated in the ring-shaped vibration member 13, the support end 12b of the auxiliary vibration member 12 which is the junction point of the outer wall 11 does not vibrate and the vibration of the ring-shaped vibration member 13 is not propagated to the outer wall 11 and the vibration of the outer wall 11 is not propagated to the ring-shaped vibration member.

Figure 5:
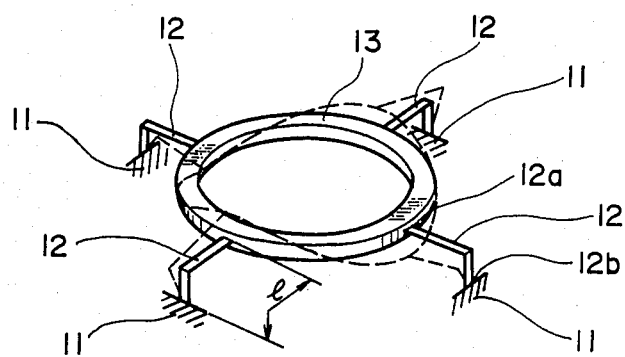

FIG. 5 shows another embodiment applied to a surface wave motor. The shape of the auxiliary vibration member 12 differs from that in the embodiment of FIG. 4. It may be selected depending on the application of the surface wave motor. The length l of the auxiliary vibration member 12 is defined by the equation (2).

Broken lines in FIGS. 4 and 5 show vibration status of the ring-shaped vibration member 13 and the auxiliary vibration member 12.

Figure 6:
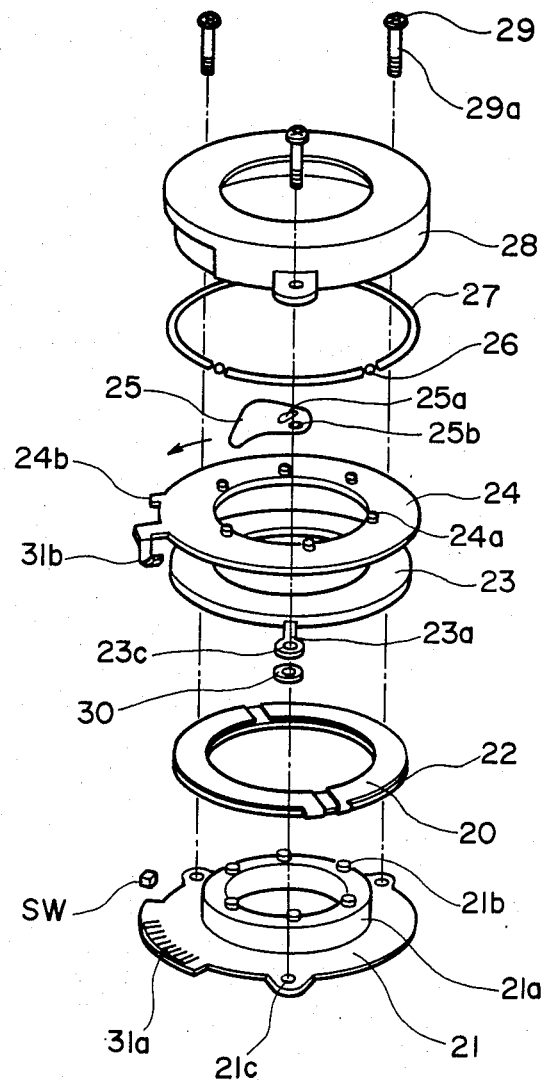
FIG. 6 shows a stop unit driven by the surface wave motor.

FIG. 6 shows a stop unit for a lens of a camera such as a still camera, cinema camera or video camera in accordance with the present invention. The unit is shown by a developed view of elements.

Referring to FIG. 6, a ring-shaped vibration member 23 bonded to an electrostrictive element 22 to which a voltage is applied through an electrode 20 and a rotor 24 which is a movable member are arranged with an appropriate clearance therebetween. A stop vane 25 is arranged thereon. A circular hole 25a and a longitudinal hole 25b of the vane 25 are fitted to a projection 21b of a base 21 and a projection 24a of the rotor 24, respectively, and a thrust bearing 26 is positioned by a spacer 27 and held by a holding plate 28. The base 21 and the holding plate 28 are fixed by bolts 29. The ring-shaped vibration member 23 is supported in union with the base 21 with an appropriate clearance therebetween by support ends 23c of auxiliary vibration members 23a which are in union with the ring-shaped vibration member 23 and extend radially, and a spacer 30, and they are precisely positioned to the base 21 by steps of the bolts 29. The base 21 has an arcuate comb-shaped electrode 31a formed on an outer periphery thereof. It contacts a brush 31b projecting from the rotor 24 to produce a signal representing a rotation angle of the rotor 24. An open reset switch SW is mounted at the end of the electrode 31a and actuated by the projection 24b formed on the rotor 24.

The rotor 24 is spring-biased to the ring-shaped vibration member 23 by a spring (not shown) arranged between a bearing 26 and the holding plate 28.

As described hereinabove, in accordance with the present invention, the auxiliary vibration members of the appropriate length are arranged in union with the ring-shaped vibration member of the surface wave motor to support the ring-shaped vibration member while not impeding the vibration of the ring-shaped vibration member. Further, a durability problem due to degradation of material is also resolved. The ends of the auxiliary vibration members can be securely fixed by the bolts so that the ring-shaped vibration member can be precisely positioned and readily held.

Since at least three auxiliary vibration members radially extend from the ring-shaped vibration member 23, the ring-shaped vibration member can be stably supported.

What we claim is:
1. A surface wave motor comprising:
(a) a ring-shaped vibration member having a plurality of electrostrictive elements to which an A.C. voltage is applied, for generating a traveling surface wave;
(b) a rotor driven by the traveling surface wave generated by said ring-shaped vibration member; and
(c) at least three auxiliary vibration members arranged equi-distantly around an outer periphery of said ring-shaped vibration member for supporting said ring-shaped vibration member to an outer wall of said motor.

2. A surface wave motor comprising:
   (a) a ring-shaped vibration member having a plurality of electrostrictive elements to which an A.C. voltage is applied, for generating a travelling surface wave;
   (b) a rotor driven by the travelling surface wave generated by said ring-shaped vibration member; and
   (c) at least three auxiliary vibration members extending radially from said ring-shaped vibration member to an outer wall of said motor for supporting said ring-shaped vibration member to the outer wall of said motor.

3. A surface wave motor according to claim 1 wherein said auxiliary vibration members are thin pins.

4. A surface wave motor according to claim 3 wherein an effective length of said thin pins is defined by $$l = \beta 4 \sqrt{\frac{EI}{\rho A \omega^2}}$$

where
$\omega$: vibration frequency
$\beta$: 2.365, 5.498, 8.639 (fundamental, secondary and ternary vibrations)
x: coordinate on an axial line of a beam, with a support end being an origin point
y: coordinate in a displacement direction of vibration from a neutral axis
E: modulus of longitudinal elasticity
I: sectional secondary moment of the beam
A: sectional area of the beam
$\rho$: density of the beam.

5. A surface wave motor according to claim 2 wherein said auxiliary vibration members are thin pins.

6. A surface wave motor according to claim 5 wherein said pins are arranged equi-distantly around an outer periphery of said ring-shaped vibration member.

7. A surface wave motor comprising:
   (a) a ring-shaped vibration member having a plurality of electrostrictive elements to which an A.C. voltage is applied, for generating a travelling surface wave,
   (b) a rotor driven by the travelling surface wave generated by said ring-shaped vibration member; and
   (c) pins acting as auxiliary vibration members for supporting said ring-shaped vibration member to an outer wall of said motor.

8. A vibration wave motor comprising:
   (a) a vibration member having a circularly-shaped outer periphery, said vibration member having electromechanical energy conversion elements to which periodic signals, having relatively different phases, are respectively applied to adjacent electromechanical energy conversion elements whereby a travelling vibration wave is generated on the surface of said vibration member;
   (b) a driven member contacting said vibration member to be driven by said travelling vibration wave; and
   (c) an auxiliary vibration member, one end of said auxiliary vibration member being connected to the outer peripheral surface of said vibration member and extending therefrom, and the other end of said auxiliary vibration member being connected to an outer wall of said vibration wave motor, thereby supporting said vibration member.

9. A vibration wave motor according to claim 8, wherein said vibration member is ring-shaped.

10. An apparatus according to claim 8, wherein said auxiliary vibration member extends radially from said ring-shaped vibration member.

11. An apparatus according to claim 8, wherein said auxiliary vibration member is pin-shaped.

12. An apparatus according to claim 11, wherein said pin-shaped vibration member has at least three pin-shaped portions.

13. A vibration wave motor comprising:
   (a) a vibration member having a circularly-shaped outer periphery, said vibration member having electromechanical energy conversion elements to which periodic signals having relatively different phases are respectively applied to adjacent electromechanical energy conversion elements, whereby a travelling vibration wave is generated on the surface of said vibration member;
   (b) a driven member contacting said vibration member to be driven by said travelling vibration wave; and
   (c) an auxiliary vibration member, one end of said auxiliary vibration member being connected to the outer peripheral surface of said vibration member and extending therefrom, and the other end being connected to an outer wall of said vibration wave motor thereby supporting said vibration member and preventing rotation of said vibration member.

14. A vibration wave motor according to claim 11, wherein said vibration member is ring-shaped.

15. An apparatus according to claim 14, wherein said auxiliary member radially extends from said ring-shaped vibration member.

16. An apparatus according to claim 14, wherein said auxiliary vibration member is pin-shaped.

17. An apparatus according to claim 15, wherein said pin-shaped vibration member has at least three pin-shaped portions.

18. An apparatus according to claim 16, wherein said pin-shaped vibration member has at least three pin-shaped portions.

19. A vibration wave motor comprising:
   (a) a vibration member having a circularly-shaped outer periphery, said vibration member having electromechanical energy conversion elements to which periodic signals having different phases are respectively applied to adjacent electromechanical energy conversion elements, whereby a travelling vibration wave is generated on the surface of said vibration member;
   (b) a driven member contacting said vibration member to be driven by said travelling vibration wave; and
   (c) an auxiliary vibration member extending from said vibration member to an outer wall of said motor, for supporting said member.

20. A vibration wave motor according to claim 19, wherein said vibration member is ring-shaped.

21. An apparatus according to claim 20, wherein said auxiliary vibration member extends radially from said ring-shaped vibration member.

22. An apparatus according to claim 21, wherein said auxiliary vibration member is pin-shaped.

23. An apparatus according to claim 22, wherein said pin-shaped vibration member has at least three pin-shaped portions.

24. An apparatus according to claim 23, wherein said pin-shaped portions of said pin-shaped vibration member are arranged on said ring-shaped vibration member with an equal distance between them.

25. An apparatus comprising:
 (a) ring-shaped vibration member having an electromechanical energy conversion element to which a signal is applied, for generating a wave;
 (b) a driven member contacting said ring-shaped vibration member; and
 (c) an auxiliary vibration member for supporting said ring-shaped vibration member on a member of said apparatus, said auxiliary vibration member extending from said ring-shaped vibration member wherein said auxiliary vibration member has at least three pin-shaped portions which are arranged on said ring-shaped vibration member with an equal distance between them.

* * * * *